United States Patent [19]

Lo

[11] Patent Number: 5,020,270
[45] Date of Patent: Jun. 4, 1991

[54] APPARATUS FOR KILLING INSECTS

[76] Inventor: Hsi-Chuan Lo, No. 14, Tsu-Li Street, Hsueh-Chia Town, Tainan Hsien, Taiwan

[21] Appl. No.: 506,849

[22] Filed: Apr. 10, 1990

[51] Int. Cl.⁵ ............................................. A01M 1/22
[52] U.S. Cl. ........................................ 43/112; 43/113
[58] Field of Search ........................... 43/112, 113, 114

[56] References Cited

U.S. PATENT DOCUMENTS

| | | | |
|---|---|---|---|
| 3,041,773 | 7/1962 | Gaglano | 43/113 |
| 3,152,420 | 10/1964 | Pawl | 43/113 |
| 3,201,893 | 8/1965 | Gesmar | 43/113 |
| 3,319,374 | 5/1967 | Gawne | 43/113 |
| 3,835,577 | 9/1974 | Soulos | 43/112 |
| 3,986,292 | 10/1976 | Klebanoff | 43/112 |
| 4,182,069 | 1/1980 | De Yoreo | 43/112 |
| 4,603,505 | 8/1986 | Millard | 43/112 |
| 4,856,226 | 8/1989 | Taylor | 43/111 |

Primary Examiner—Kurt Rowan
Assistant Examiner—Chuck Y. Mah
Attorney, Agent, or Firm—Morton J. Rosenberg; David I. Klein

[57] ABSTRACT

An apparatus for killing unwanted insects such as mosquito includes a lamp assembly powered to generate light attractive to insects, an electric screen surround the lamp assembly and applied thereto with a voltage sufficient to kill insects in contact, a grill surrounding the electric screen for preventing persons or pets from access of the electric screen and a fan assembly arranged to force insects flying around the grill inwardly to contact the electric screen and thus to be killed.

1 Claim, 3 Drawing Sheets

A - A

APPARATUS FOR KILLING INSECTS

BACKGROUND OF THE INVENTION

This invention relates to the killing of unwanted insects such as mosquitoes, and more particularly to the use of an attraction light source, an electric screen and a suction fan in combination to accomplish this end.

Heretofore, chemicals have generally been used to eliminate insects such as mosquitoes while such chemical insecticides have been effective in killing insects, several deleterious side effects accompany their use. In indoor rooms or spaces, such insecticides may leave a chemical reside on carpets, upholstery or even in cooking equipments thus affecting the health of the residents, especially infant residents.

The use of an attration light source and an electric screen in combination to kill insects has been developed. Apparatus thus constructed is effective in killing insects yet, usually, many insects fly around the apparatus by attraction and only few of the insects fly towards electrified screen and to be killed. To this end, the inventor has attempted to make an improved apparatus for killing insects to overcome the drawbacks of a known apparatus.

SUMMARY OF THE INVENTION

Accordingly, objects of the present invention are to overcome problems and disadvantages of prior insect-killing apparatus, and obtain improved killing structures with novel advantages not heretofore available.

Another object of the present invention is to provide an improved structure of an insect-killing apparatus having means for attracting insects and further force them to move towards an electrified screen thus to be killed.

A further object of the present invention is to provide an improved structure of an insect-killing apparatus having means for collecting killed insects.

With the above objects in view, an apparatus for killing insects according to this invention comprises a lamp assembly powered to generate light attractive to insects for attracting to fly around, an electric screen surrounding the lamp assembly and applied thereto with a voltage sufficient to kill insects in contact, a grill surrounding the electric screen for preventing persons or pets from access of the electric screen and a fan assembly powered to force inwardly of the insects flying around to be killed in contact with the electric screen.

DETAILED DESCRIPTION OF THE PREFERRED EMBODIMENT

Figure 1:
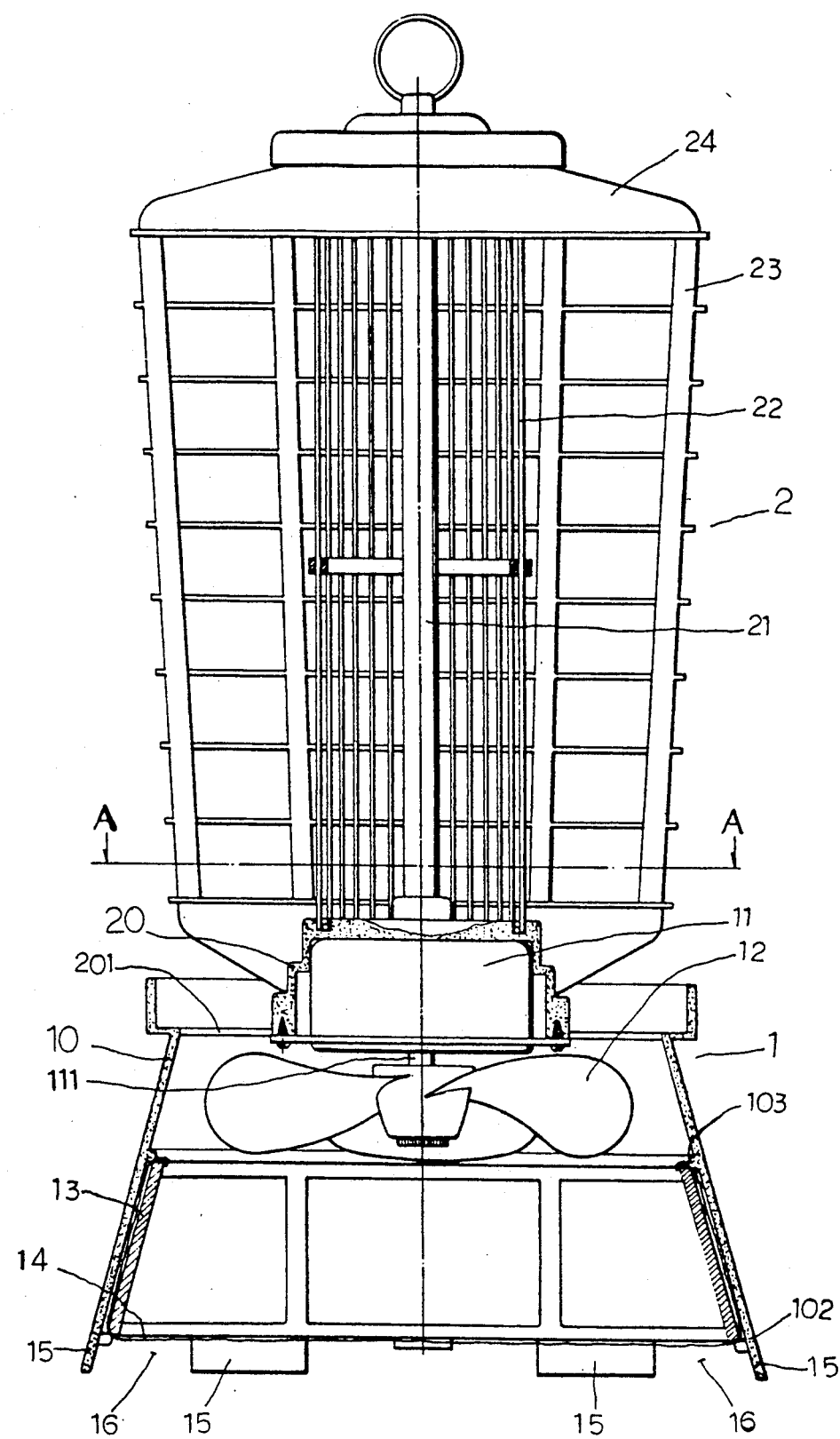
FIG. 1 is a cross-sectional view of the preferred embodiment according to the present invention.
Figure 2:
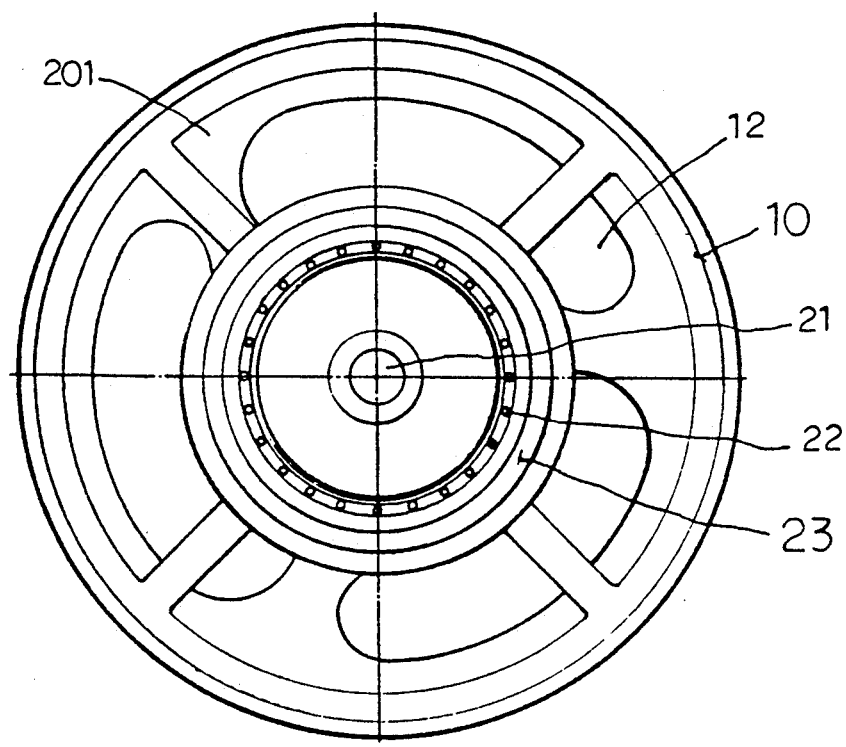
FIG. 2 illustrates a cross-sectional view of the embodiment taken along line A—A of FIG. 1.

Referring to FIGS. 1 & 2, an apparatus for killing insects such as mosquito according to the present invention comprises mainly a suction fan device 1 which serves as a stand of this apparatus for supporting an insect-killing device 2 mounted thereon.

The suction fan device 1 includes a substantially truncated conical fan housing 10 defining a suction opening 201 in its top end and a discharge opening 16 in its bottom end. A motor housing 20 is coaxially disposed in an upper portion of the fan housing 10 for receiving a motor 11 therein and coacts with top end of the fan housing 10 to define an air inlet passage 201 extending downwardly towards the discharge opening 16. The motor 11 has an axis extending downwardly for mounting a fan 12. A plurality of spaced legs 15 extending substantially downwardly from the bottom of the fan housing 10 are provided for resting the apparatus of this invention on a floor or ground and remoting the discharge opening 16 of the fan housing 10 from the ground.

An upper circumferential lug 103 and a lower circumferential lug 102 spaced from the former lug 103 both projecting inwardly from the inner surface of the fan housing 10 are provided for retaining a sleeve 13 which has an open top and an open bottom confining the air flow passage 201 defined by the fan housing 10. A net 14 covers conical side wall and across the open bottom of the sleeve 13 for separating killed insects from air flow generated by the electric fan assembly 11, 12.

The insect-killing device 2 includes a lamp assembly 21 axially mounted on the motor housing 20 and electrically powered to generate a light attractive to mosquito, an electric screen 22 also mounted on the motor housing 20 and surrounding the lamp assembly 21, and a protection grill 23 mounted on the motor housing 20 and surrounding the electric screen 22 that prevents persons or pets from access of the screen 22. The grill 23 has an open top which is closed with a protection cover 24.

Figure 3:
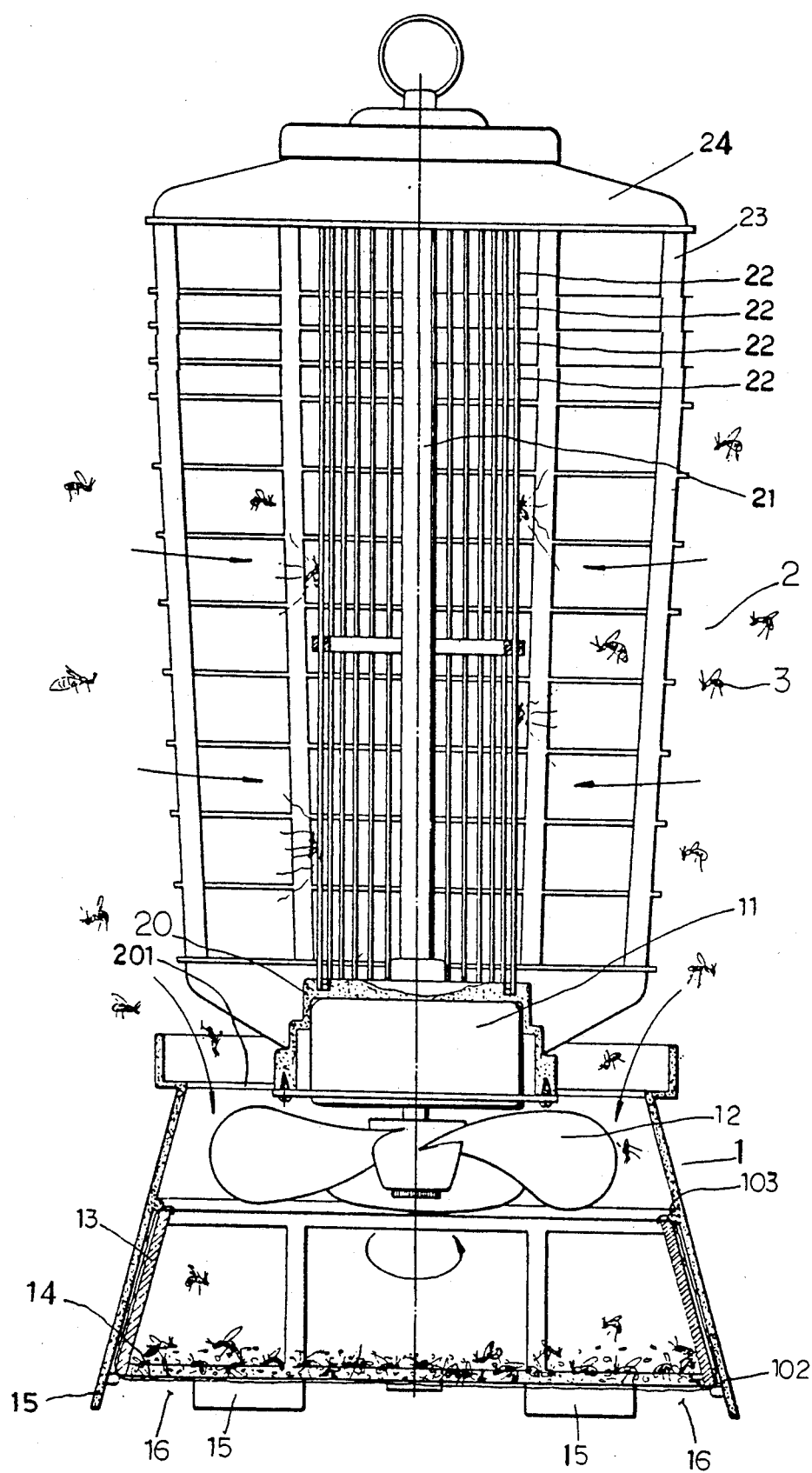
FIG. 3 is a diagramatically cross-sectional view corresponding to FIG. 1.

In operation, as shown in FIG. 3, the apparatus of this invention is started by turning on a control switch (not shown) to: (1) start the lamp assembly which generates a light to attract mosquitoes; (2) apply to the electric screen 22 with a proper voltage which is sufficient to kill mosquito; and (3) start the electric fan assembly to draw air from top portion and blow the same to bottom portion of this apparatus. The mosquitoes 3 flying around the insect-killing device 2 of the apparatus by attraction are forced inwardly to contact the electric screen 22 thus to be killed and drawn downwardly along the air flow into the sleeve 13 thus collected therein by means of the net 14 through the air inlet passage 201.

It is intended that all matter contained in the above description or shown in the accompanying drawing be interpreted as illustrative and not in a limiting sense. It is also to be understood that the following claim is intended to cover all of the generic and specific features of the invention herein described.

What is claimed is:

1. An apparatus for killing insects comprising:
  a fan housing having a substantially cylindrical hollow casing defining an air flow passage therethrough and said fan housing being positioned vertically on a floor, and having a first opening at its upper end serving as an air intake opening and a second opening at its lower end serving as an air discharge opening;
  a motor housing coaxially disposed in an upper portion of said fan housing for receiving a motor therein and for defining an air inlet passage extending downwardly towards said discharge opening;
  a plurality of spaced legs extending downwardly from said fan housing for providing vertical positioning and for displacing said discharge opening of said fan housing from the ground;

an upper circumferential lug and a lower circumferential lug spaced each from the other, each of said lugs projecting inwardly from an inner surface of said fan housing;

a sleeve retained in said upper and lower circumferential lugs having an open top and an open bottom for confining an air flow passage defined by said fan housing;

blower means disposed in said fan housing for drawing air from an external environment above said fan housing and blowing said air through the fan housing along said air flow passage therein;

a net member distributed across said air flow passage of said fan housing at its lower open end having a mesh dimensioned to separate insects from air flow generated by said blower means;

a lamp assembly mounted to a top surface of said motor housing and axially extending therefrom for generating a light attractive to insects;

an electric screen surrounding said lamp assembly and mounted to a top surface of said motor housing for killing insects in contact therewith by means of a voltage applied thereto by an electric power source; and a grill means surrounding said electrical screen and mounted to side surfaces of said motor housing.

* * * * *